N. C. FONTNEAU & A. PERSON.
CIGAR CUTTER.
APPLICATION FILED OCT. 22, 1913.
1,100,364. Patented June 16, 1914.
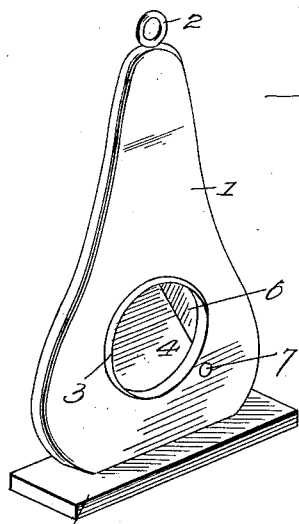
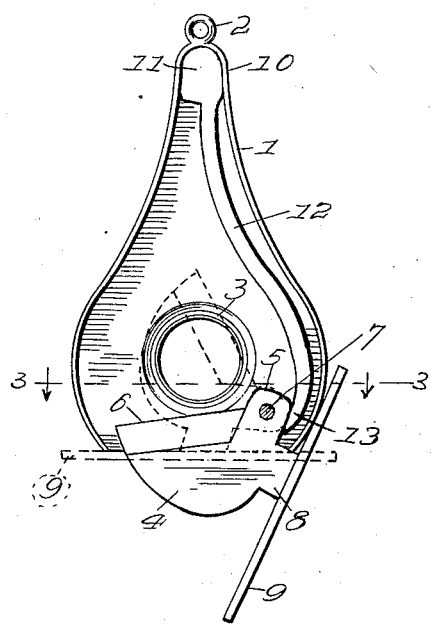
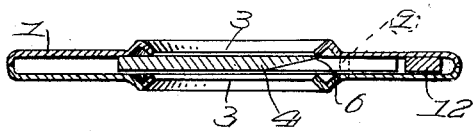

UNITED STATES PATENT OFFICE.

NELSON C. FONTNEAU AND AXEL PERSON, OF ATTLEBORO, MASSACHUSETTS, ASSIGNORS TO FONTNEAU & COOK CO., OF ATTLEBORO, MASSACHUSETTS, A CORPORATION OF MASSACHUSETTS.

CIGAR-CUTTER.

1,100,364. Specification of Letters Patent. Patented June 16, 1914.

Application filed October 22, 1913. Serial No. 796,639.

*To all whom it may concern:*

Be it known that we, NELSON C. FONTNEAU and AXEL PERSON, citizens of the United States, residing at Attleboro, in the county of Bristol and State of Massachusetts, have invented a new and useful Improvement in Cigar-Cutters, of which the following is a specification.

This invention relates to certain new and useful improvements in cigar cutters and the primary object thereof is to provide a device of the type set forth which has improved means for positively maintaining the cutting blade in open and closed positions.

Further, the invention aims to provide a cigar cutter which is of simple and economical structure, and one possessed of a minimum number of parts, and to also provide the cutting blade with means which permits same to be easily moved to and from cutting positions and which also acts as a support for the entire structure, and enhance the ornamental and artistic properties of the device.

In the drawings Figure 1 is a perspective view of the invention. Fig. 2 is a side elevation, one half of the casing being omitted, and Fig. 3 is a section on the line 3—3 of Fig. 2.

In proceeding in accordance with the invention, a casing or housing 1 is provided at one end with an eye 2 to allow same to be suspended from a watch or other chain, the other end of the casing being left open. The opposite sides of the casing are provided with openings 3 which register and are adapted to receive the cigar tip.

The cutting blade 4 has a heel 5 which extends outwardly at right angles thereto, and which is preferably located at the inner end of the beveled cutting edge 6, the heel corners being rounded. The heel is pivoted by a pin or rivet 7 to the casing 1. A shank 8 is formed on the cutting blade 4 and has a plate 9 secured to its free or outer end. The plate 9 extends beyond the sides and ends of the casing, as depicted in Fig. 1 of the drawings and acts to provide not only a pair of easily accessible finger and thumb gripping ends to allow the blade to be moved to open position, but also a flat outer face which provides a perfect seat for the thumb of the user enabling the cutting blade to be conveniently moved to cutting position. Further the plate 9 acts to close the open end of the casing; to restrict inward movement of the cutting blade, and to provide a means of support for the entire structure should it be desired to support same in an upright position, as depicted in Fig. 1 of the drawings.

The casing 1 preferably has a contracted neck 10 which receives the enlarged head 11 of a flat spring 12, the head thus held by the casing neck against displacement, in which position it is secured by solder. The spring is preferably curved to generally conform to the contour of the adjacent casing side and has its free end 13 curved inwardly so as to bear against the outer end of the heel 5.

The free end of the spring which extends slightly beyond the outer side of the heel acts to positively hold the cutting blade in either open or closed position, while still allowing easy manipulation thereof by the thumb and forefinger of the operator.

Having thus described our invention, we claim as new and desire to secure by Letters Patent:—

In a cigar cutter, a housing having a contracted neck at one end and having its opposite end open, a cutting blade having a right angular heel, means to pivot the heel to the housing, said blade having a shank which projects outwardly therefrom through the open end of the housing, a flat spring having an enlarged head which is received in the housing neck, said spring having an inwardly curved free end which engages the heel and extends beyond the outer side thereof, and a plate secured to the outer end of the shank, said plate abutting and acting to close the open end of the housing and having its sides and ends extending beyond the respective sides and ends of the housing.

In testimony whereof we have signed our names to this specification in the presence of two subscribing witnesses.

NELSON C. FONTNEAU.
AXEL PERSON.

Witnesses:
ADA E. HAGERTY,
J. A. MILLER.

Copies of this patent may be obtained for five cents each, by addressing the "Commissioner of Patents, Washington, D. C."